United States Patent
Puri et al.

(10) Patent No.: US 10,536,580 B2
(45) Date of Patent: Jan. 14, 2020

(54) RECOMMENDATIONS BASED ON FEATURE USAGE IN APPLICATIONS

(71) Applicant: ADOBE INC., San Jose, CA (US)

(72) Inventors: Nikaash Puri, New Delhi (IN); Shagun Sodhani, New Delhi (IN)

(73) Assignee: Adobe Inc., San Jose, CA (US)

( * ) Notice: Subject to any disclaimer, the term of this patent is extended or adjusted under 35 U.S.C. 154(b) by 129 days.

(21) Appl. No.: 15/705,042

(22) Filed: Sep. 14, 2017

(65) Prior Publication Data

US 2018/0352091 A1     Dec. 6, 2018

Related U.S. Application Data

(60) Provisional application No. 62/513,814, filed on Jun. 1, 2017.

(51) Int. Cl.
    *G06F 17/30*        (2006.01)
    *H04M 7/00*         (2006.01)
    *H04L 29/08*        (2006.01)
    *H04M 1/725*       (2006.01)

(52) U.S. Cl.
    CPC .......... *H04M 7/0036* (2013.01); *H04L 67/22* (2013.01); *H04L 67/306* (2013.01); *H04M 1/72522* (2013.01)

(58) Field of Classification Search
    CPC .................................................. G06F 17/2211
    USPC ......................................................... 707/748
    See application file for complete search history.

(56) References Cited

U.S. PATENT DOCUMENTS

| | | | | |
|---|---|---|---|---|
| 2009/0164494 A1* | 6/2009 | Dodin | ........................ | G06F 8/42 |
| 2009/0254336 A1* | 10/2009 | Dumais | ................... | G06F 9/451 704/9 |
| 2009/0259987 A1* | 10/2009 | Bergman | .................. | G06F 8/36 717/107 |
| 2015/0378997 A1* | 12/2015 | Becker | .................... | G06F 16/93 707/748 |
| 2015/0379092 A1* | 12/2015 | Becker | .................... | G06F 16/93 707/769 |
| 2015/0379887 A1* | 12/2015 | Becker | .................... | G06F 16/93 715/229 |

(Continued)

OTHER PUBLICATIONS

Koren, Yehuda, et al., "Matrix factorization techniques for recommender systems." Computer 8 (2009): 30-37.

(Continued)

*Primary Examiner* — Baoquoc N To
(74) *Attorney, Agent, or Firm* — Shook, Hardy & Bacon, L.L.P.

(57) ABSTRACT

Some implementations provide a feature recommendation system that receives sequences from user sessions with applications, where each sequence is of features of the applications in an order the features were used by a user. The sequences are applied to a feature embedding model that learns semantic similarities between the features based on occurrences of the features in the sequences in a same user session. A request is received for a feature recommendation that identifies a feature of an application used by a given user in a user session. A recommended feature for the feature recommendation is determined from a set of the semantic similarities that are between the identified feature and others of the features. The feature recommendation is presented on a user device associated with the given user.

20 Claims, 6 Drawing Sheets

(56) References Cited

U.S. PATENT DOCUMENTS

| | | | | |
|---|---|---|---|---|
| 2016/0150072 A1* | 5/2016 | Rangarajan | ....... | H04W 52/0254 |
| | | | | 455/574 |
| 2017/0249067 A1* | 8/2017 | Marzke | ............. | G06F 16/24575 |
| 2018/0184264 A1* | 6/2018 | Dulick | ................ | H04L 12/1435 |
| 2018/0322253 A1* | 11/2018 | Goyal | ..................... | G06F 19/00 |

OTHER PUBLICATIONS

Zhou, Yunhong, et al., Large-scale parallel collaborative filtering for the netflix prize. Algorithmic Aspects in Information and Management. Springer Berlin Heidelberg, 2008, 337-348.

Mikolov, Tomas, et al. "Efficient estimation of word representations in vector space." arXiv preprint, arXiv:1301.1781 (2013).

Pennington, Jeffrey, et al. "Glove: Global Vectors for Word Representation." EMNLP, vol. 14, 2014.

Sarwar, Badrul, et al., "Item-based collaborative filtering recommendation algorithmns." Proceedings of the 10th international conference on World Wide Web. ACM, 2001.

Collobert, Ronan, et al., "A unified architecture for natural language processing: Deep neural networks with multitask learning." Proceedings of the 25th international conference on Machine learning. ACM, 2008.

Mnih, Andriy, et al., "A scalable hierarchical distributed language model." Advances in neural information processing systems. 2009.

Harper, F. Maxwell, et al., "The MovieLens Datasets: History and Context." ACM Transactions on Interactive Intelligent Systems (TiiS) 5, 4, Article 19 (Dec. 2015), 19 pages.

Krishnamurthy, Balaji, et al., "Learning Vector-Space Representations of Items for Recommendations using Word Embedding Models," Elsevier, The International Conference on Computational Science, Procedia Computer Science, vol. 80, 2016, pp. 2205-2210.

* cited by examiner

RECOMMENDATIONS BASED ON FEATURE USAGE IN APPLICATIONS

BACKGROUND

Applications can include many features, which users can select from to perform tasks. As an example, in Adobe® Photoshop®, when creating a composition, a user could select from cut, paste, select, mask, resize, color select, magic wand, crop, clone stamp, healing brush, and other features. Accessing features, however, may be difficult for users. For example, the number and functionality of features of an application may change over time, the application interface may change, some features may be difficult to discover in a user interface, and some features may be complex, especially for new users. Furthermore, a user may have an objective which cannot be met by a single feature. In such a case, the user may not know how to combine features to achieve that objective or the most efficient way to achieve that objective, resulting in computationally intensive tasks. These and other issues can create barriers between the interactions between computing systems and users.

Accordingly, feature-related recommendations may be provided to users in the form of tutorials and notifications to mitigate some of these issues. Using conventional approaches, however, these recommendations are unlikely to be relevant to many users, which may be at different experience levels, or desire to accomplish different objectives. Furthermore, recommendations in conventional approaches are limited to an application being used, whereas a different application may be more relevant to a user. For instance, in some conventional approaches, the most popular features of an application are recommended to users. In addition to irrelevant recommendations, new features are unlikely to become popular and recommended. In another approach, users are assigned to segments based on how often they use an application (e.g., to capture experience levels), and a particular user is presented with recommendations manually curated for that user's segment. This approach fails to account for different user objectives and other variations between users, which limits the relevance of recommendations.

SUMMARY

The present disclosure provides, in part, computing systems with feature recommendation capabilities that improve interactions between computing systems and users. Feature recommendations can be determined and presented in real-time as users interact with applications based on particular features of the applications used in active user sessions. This is facilitated using a feature embedding model in which a word embedding model is trained to map features to a vector space, rather than words. In training the feature embedding model, features can be treated as words, and user sessions (each comprising a sequence of features in the order in which they were used) can be treated as sentences, to capture semantic relationships between the features in the vector space.

The feature embedding model is trained based on occurrences of the features (also referred to herein as "particular sets of the features") in user sessions. It has been found that capturing semantic similarity from usage of a set of features in a same user session results in highly relevant feature recommendations. Thus, identified particular sets of the features are applied to the feature embedding model to capture the semantic relationships between those features. When at least one feature is used in an active user session, a set of semantically similar features can be identified from the vector space of the feature embedding model to produce feature recommendations.

In some respects, a user session can include features from multiple applications, such that computing systems can learn semantic similarities between features of different applications, and features in one application can be used to recommend features of other applications. Real-time feature recommendations can be facilitated for computing systems using an architecture in which a central server batch processes sequences of features to update the feature embedding model, and periodically provides corresponding updates to preprocessed results data that edge servers use to recommend features. At the edge servers, user feedback and other user preference data can be applied to the preprocessed results data to reflect that information in feature recommendations in real-time or near real-time.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
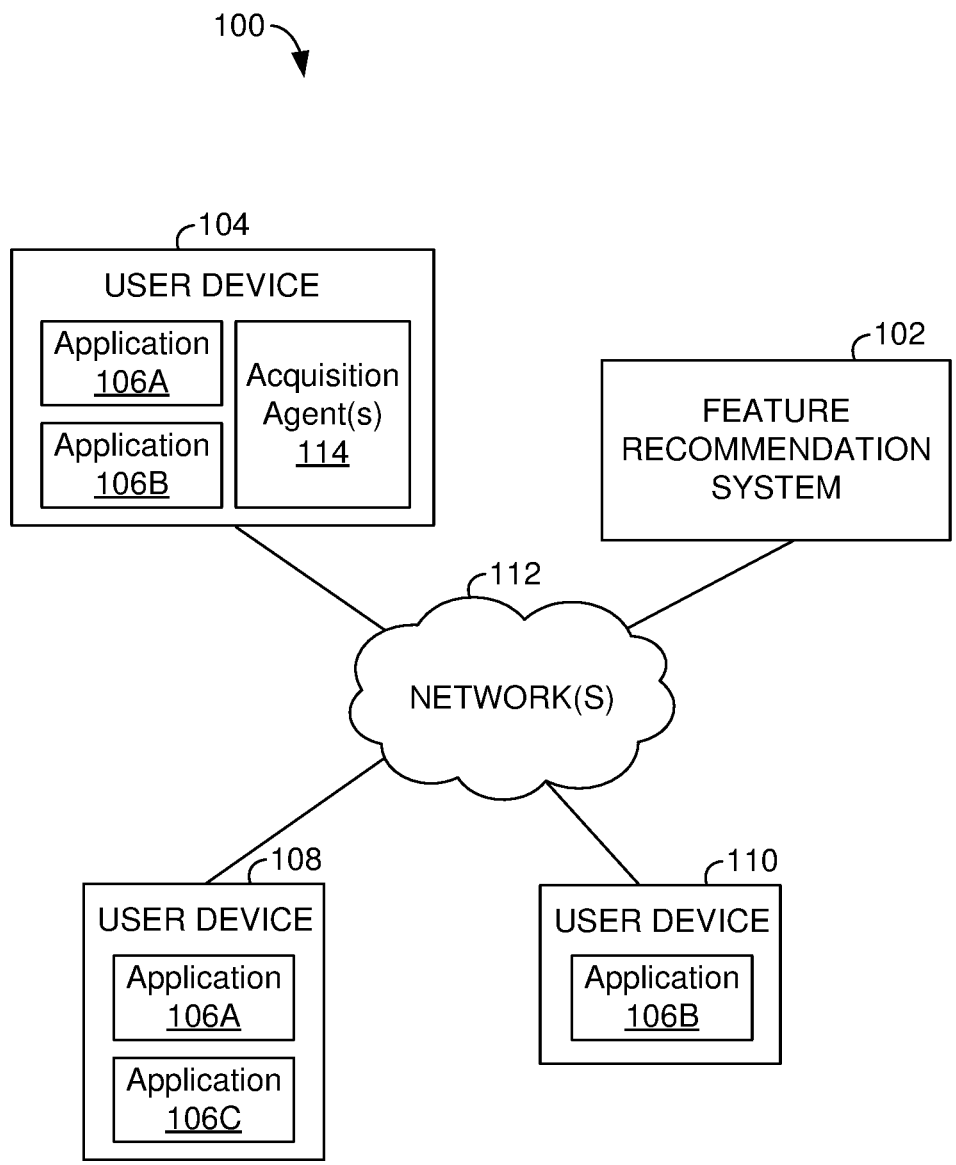
FIG. 1 is a block diagram of an exemplary operating environment in which some embodiments of the invention may be employed.

Feature-related recommendations can be provided to users to facilitate interactions between the computing system and users. Conventional systems, are unable to capture the semantic relationships between features based on how those features are used together, thereby resulting in non-personalized recommendations. For example, one conventional approach merely recommends the most popular features of an application amongst all users regardless of how those features are typically used together. In another conventional approach, users are assigned to segments based on how often they use an application (e.g., to capture experience levels), and a particular user is presented with recommendations manually curated for that user's segment. This approach also fails to account for the interrelationships between features and differences in underlying user objectives. Furthermore, recommendations in these conventional approaches are limited to the application being used, whereas a different application may be more relevant to a user.

In accordance with embodiments described herein, personalized or customized feature recommendations can be provided based on feature usage within an application and/or across applications. At a high-level, and as described herein, a feature embedding model can be provided that learns semantic similarities between features (e.g., individual features and/or workflows) of applications based on particular sets of the features that occur in the same user session. These occurrences are captured within sequences of features in the order the features were used in user sessions, similar to a sentence of words. Thus, a sequence of features can be treated as a sentence to construct a feature embedding model using natural language processing (NLP) techniques.

As used herein, a "feature embedding model" refers to a machine learning model in which particular features (e.g., individual features and/or workflows) of applications are mapped to vectors. This mapping can be learned, for example, using neural networks, dimensionality reduction on feature co-occurrence matrices, and/or probabilistic models. In the vector space, each feature may be represented by a respective vector (i.e., a feature embedding), where the semantic similarity between two features can correspond to a distance between their feature vectors. The feature embeddings can be derived, for example, by mathematically embedding from a space with one dimension per individual feature or workflow to a vector space (e.g., a continuous vector space) with a lower dimension. A feature embedding model can be a word embedding model in which features (e.g., individual features and/or workflows) are utilized in place of words in order to capture semantic similarities between the features in a vector space. A "word embedding model" is a collective name for any of a set of language models in which words or phrases are mapped to vectors of numbers.

"Semantic similarities" between features can refer to similarities in meanings of those features, where the meaning of a feature corresponds to contexts in which the feature is used. The feature embedding model can learn a quantitative representation of these meanings for different features that allows the similarity between the different features to be compared and analyzed. The semantic similarities can be learned based on patterns formed by the occurrences of features over many user sessions, such that the features may be considered more similar when they are used together in particular ways. These patterns can be based on the order in which particular features tend to occur, the frequency that particular features occur in the same user session, the distance between particular features, and co-occurrences of particular features.

As indicated above, the feature embedding model can employ techniques which are conventionally utilized in natural language processing to encode semantics and syntax of words. Semantics and syntax are terms often used when discussing linguistics, as words have underlying semantic meaning and syntactical rules for arranging them into sentences. However, usage of application features is typically thought of in an ad hoc manner, where users select particular features to accomplish particular tasks or objectives.

It has been found that a semantic and syntactic structure can be determined from application features based on the way they are used in applications to provide useful feature recommendations to users. For example, users might select only a limited set of features to accomplish a particular objective, and those features may be used in a particular order. In this way, a sequence of features used in a user session can be analogized to a sentence. Over many user sessions, these sequences can form the semantics and syntax used to accomplish various objectives. Thus, capturing semantic similarity of features from this usage can result in objective focused recommendations, which are highly relevant to users. For example, a feature may be used in a user session when a user is attempting to accomplish an objective. Using approaches described herein, a set of semantically similar features can be identified from a vector space of a feature embedding model to produce feature recommendations that are likely to be relevant to that objective.

Using approaches described herein, a feature embedding model provides computing systems with a deep understanding of the way features are used by users in applications to provide useful and contextual feature recommendations to users. This can provide computing systems with the ability to recommend features that are more likely to be relevant to particular users, for example, by determining relevant features to those recently used by those users. Furthermore, the computing systems are able to recommend features that might not be popular overall, but are frequently used with features recently used by a user. These approaches can further provide computing systems with the ability to account for different user objectives and to recommend features that are likely to be related to particular user objectives.

In various implementations, a user session can include features from multiple applications, allowing computing systems to learn semantic similarities between features of different applications. Using the feature embedding model, features in one application can be used to recommend features of other applications to users. Thus, for example, a user that works on a composition in one application and opens the composition in another application can, upon opening the new application, be presented with a recommended feature relevant to the features used in the prior application.

Various aspects of the present application relate to providing computing systems with the ability to quickly determine feature recommendations with reduced processing and latency. This allows the systems to determine and provide real-time feature recommendations during active user sessions based on features recently used in those sessions.

In some respects, the forgoing can be facilitated using a system architecture in which a central server(s) batch processes sequences of features to perform processor intensive updates to the feature embedding model, and periodically provides corresponding updates to preprocessed results data that edge servers use to recommend features. At the edge servers, tasks that may have relatively low processing requirements can be performed on the preprocessed results data to provide feature recommendations that reflect that information in real-time or near real-time.

In further respects, preprocessed results data can be determined from a feature embedding model and used to determine feature recommendations. The preprocessed results data can include for each feature, a set of the features that are most semantically similar to that feature in the feature embedding model (e.g., the top ten most similar features optionally with corresponding similarity scores). A computing system may receive a request for a feature recommendation based on at least one feature used by a user in a user session. In determining the feature recommendation, the system can for each feature in the request, retrieve the corresponding set of most similar features from the preprocessed results data (e.g., derived from the vector space). The system can collectively analyze these data sets to recommend one or more of the similar features in the feature recommendation. Optionally, this analysis may account for user feedback and other user preferences data.

In some aspects, the present disclosure provides for data acquisition agents, which act on behalf of a feature recommendation system. These agents may be integrated into the applications from which features are used and tracked and/or may be embodied as separate applications or services on user devices. A data acquisition agent may track feature usage in the applications and/or collect and provide feature usage information from one or more applications to the feature recommendation system (e.g., as the sequences of features of user sessions). A data acquisition agent may further track and/or collect recently used features and provide those features in requests for feature recommendations. A data acquisition agent may further track and/or collect user feedback on feature recommendations and provide that information to the feature recommendation system for future feature recommendations.

Thus, various aspects of the present disclosure address technological shortcomings associated with existing feature recommendation systems. The interactions between computing systems and users can be improved using feature recommendations provided in a processing efficient and low latency manner.

Various aspects are generally described to facilitate an understanding of the present disclosure. As used herein a "feature" of an application refers to a specific set of one or more computing operations, that are predefined as part of the application. Each computing operation of a feature may be explicitly, purposefully, and separately invocable by a user of the application via user input. As used herein an "individual feature" refers to a feature that includes one computing operation (i.e., a single user invocable computing operation). Also as used herein, "a workflow" refers to a feature that includes multiple computing operations. An "ordered workflow" refers to a workflow that has a defined order of at least some of the computing operations. In this case, the same computing operations in a different order would be considered a different workflow. An "order agnostic workflow" refers to a workflow that does not have a defined order of its computing operations. In this case, the same computing operations in a different order would be considered the same workflow.

Computing operations of features could, for example, correspond to steps in creating a composition in one or more applications. Examples of a computing operation is a cut operation, a paste operation, a select operation, a mask operation, a resize operation, a color select operation, a magic wand operation, a crop operation, a clone stamp operation, a healing brush operation, and more. An individual feature could correspond to a single step in creating the composition. In contrast, a workflow could correspond to a group of steps that collectively accomplish some larger objective (e.g., make a user in a photo look older, remove an object from the photo, remove skin blemishes from a person in a photo, remove an instrument from an audio track, etc.).

It is noted that to apply a feature to a feature embedding model, the feature may be represented using one or more particular words, characters, and/or symbols. However, these are used not as lexical representations of words, but as feature identifiers of specific features. For example, one feature corresponding to a cut operation could be represented using the string "f1," and another feature corresponding to a paste operation could be represented using the string "f2." When encoding used features into a sequence of features applied to the feature embedding model, the system (e.g., an acquisition agent) can map each used feature to it's corresponding feature identifier and include that feature identifier in the sequence to represent the feature. For example, as will be described in further detail below, each application and/or acquisition agent may reference predefined mappings in storage to construct the sequences and/or to interpret feature recommendations comprising one or more feature identifiers.

A "user" refers to a particular digital identity that interacts with a computing system. The user may be tracked and maintained in the feature recommendation system in the form of a user profile containing information the system uses to associate user inputs, feature use, application use, user feedback, user preferences, and other information to that user. Terms such as user input are not intended to necessarily correspond to a particular user. Typically, the user profile includes a user identifier, such a universally unique identifier (UUID), a login and password, and/or email address the system uses to identify a user.

Turning now to FIG. 1, a block diagram is provided illustrating an exemplary operating environment 100 in which some embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, operating environment 100 includes an feature recommendation system 102 and a number of user devices, such as user device 104, user device 108, and user device 110. It should be understood that operating environment 100 shown in FIG. 1 is an example of one suitable computing environment. For example, any number of user devices could be employed. Furthermore, feature recommendation system 102 could be at least partially integrated into one or more of the user devices and/or applications or services thereof.

Each of the components shown in FIG. 1 may be implemented via a computing device, such as computing device 600 described with reference to FIG. 6, for example. The components may communicate with each other via network 112, which may include, without limitation, one or more local area networks (LANs) and/or wide area networks (WANs). Such networking environments are commonplace in offices, enterprise-wide computer networks, intranets, and the Internet. It should be understood that any number of devices may be employed with operating environment 100 within the scope of the present invention. Each may comprise a single device or multiple devices cooperating in a distributed environment. For instance, the functionality of feature recommendation system 102, as described herein, could be provided by a single server device or by multiple server devices operating collectively. Additionally, other components not shown may also be included within the network environment.

Operating environment 100 illustrates a computing environment in which feature recommendation system 102 may provide recommendations of features of one or more applications, such as one or more of applications 106A, 106B, and 106C. Instances of applications 106A, 106B, and 106C are shown as being installed on various user devices 106, 108, and 110, by way of example only. For example, applications 106A and 106B are installed on user device 106, applications 106A and 106C are installed on user device 108, and application 106B is installed on user device 110. The user devices can include one or more processors, and one or more computer-readable media. The computer-readable media may include computer-readable instructions executable by the one or more processors, which includes application code of the applications.

Although the applications are described as being installed on user devices, this need not be the case. For example, one or more of the applications, and/or portions thereof may be hosted by one or more servers, such as servers of feature recommendation system 102, and accessed via the user devices. As an example, an application could be a web application, which can run in a web browser on a user device, and could be hosted at least partially on the server-side of operating environment 100 (e.g., on feature recommendation system 102). In addition, or instead, an application could be a dedicated application. In some cases, the application is integrated into the operating system (e.g., as a service) of a user device.

Applications 106A, 106B, and 106C are different applications that can be run on and/or accessed from a user device. Each of the applications includes a different set of features provided as part of that application. Users are able to selectively use these features to cause the application to carry out computing operations corresponding to the features. By way of example, in some cases, in order to use a feature of application 106A, a graphical user interface (GUI) is displayed to the user (optionally provided by feature recommendation system 102), which receives user inputs that invoke particular features of the application. For example, user input can be provided to a user device associated with the instance of the application.

Examples of suitable types of applications are those that include features users can employ to create, manipulate, edit, and/or modify a digital composition. Examples of digital compositions include an image, a video, an audio sequence, a video game, a vector graphics file, a presentation, a textual document, a creative work, and more. Adobe Illustrator®, Adobe Photoshop, and Adobe Premiere® are examples of suitable applications.

Generally, feature recommendation system 102 is configured to receive sequences of features used in one or more of applications 106A, 106B, and 106C of user devices 104, 108, and 110. From those sequences of features, feature recommendation system 102 constructs a feature embedding model that learns semantic relationships between the features from the sequences of used features. Feature recommendation system 102 can receive requests for feature recommendations from the user devices based on one or more features used in a particular session. The model can then be used to generate the feature recommendations using the feature embedding model. Feature recommendation system 102 transmits those recommendations to the user devices, where content corresponding to the recommendations can be displayed. The content may be displayed within an application(s), or another application or service. In some cases, the content could comprise a push notification or other message. This message could be displayed by an operating system of a user device, or an email application.

As indicated above, feature recommendation system 102 can be implemented using at least one server device, platform with corresponding application programming interfaces (APIs), cloud infrastructure, and the like. For example, the various communications or transmissions between user devices (e.g., client devices), other components, and feature recommendation system 102 can use an API implemented by feature recommendation system 102. The various requests, responses, actions, and other information exchanges can be made via one or more network communications or other transmissions between the user devices and feature recommendation system 102 containing API calls which correspond to those actions, requests, and responses.

Figure 2:
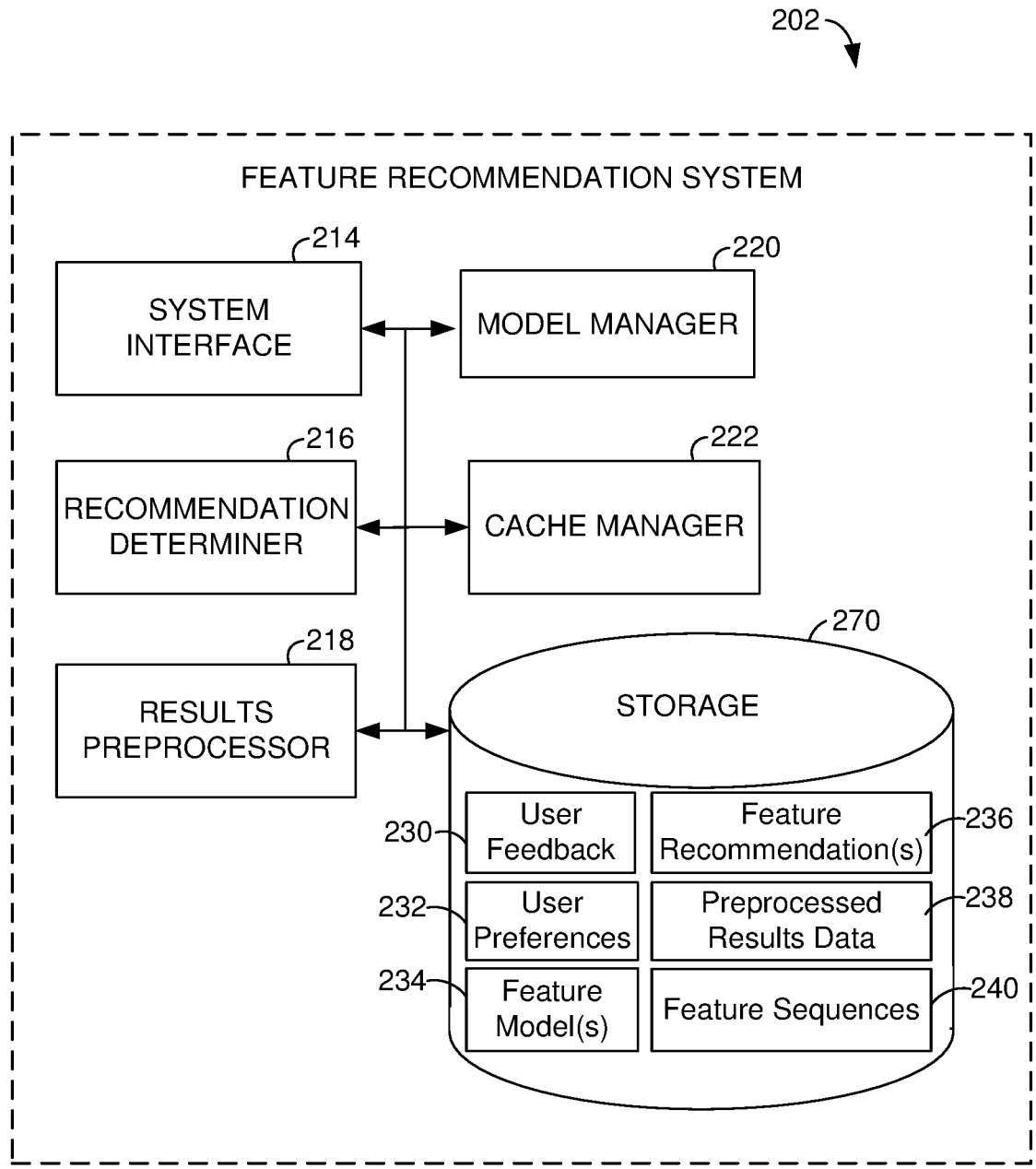
FIG. 2 is a block diagram of an exemplary feature recommendation system in accordance with some embodiments of the invention.

FIG. 2 is a block diagram of an exemplary feature recommendation system 202 in accordance with some embodiments of the invention. Feature recommendation system 202 can correspond to feature recommendation system 102 in FIG. 1. In the example shown, feature recommendation system 202 includes various components, including but not limited to system interface 214, recommendation determiner 216, results preprocessor 218, model manager 220, cache manager 222, and storage 270. FIG. 2 shows potential channels for exchange of data between the various components of feature recommendation system 102.

As an overview, system interface 214 is generally responsible for receiving transmissions to and providing transitions from feature recommendation system 202 in order to facilitate communications between feature recommendation system 202 and other systems and/or devices, such as user devices 104, 108, and 110 in FIG. 1. Model manager 220 is responsible for managing feature embedding models, such as feature model 234, which can include constructing and/or updating those models. Results preprocessor 218 is responsible for preprocessing feature model 234 to generate preprocessed results data 238. Cache manager 222 is responsible for managing preprocessed results data 238. Recommendation determiner 216 is responsible for determining feature recommendations from feature model 234, which can be by way of preprocessed results data 238. Storage 270 is configured to store the various information generated and/or used by feature recommendation system 202, and provide that information, as needed, to the various components of feature recommendation system 202.

Storage 270 can comprise one or more computer-readable storage media and is configured to store computer instructions (e.g., software program instructions, routines, or services), data, and/or models used in embodiments described herein. In the example shown, this information includes user feedback 230, user preferences 232, feature model(s) 234, feature recommendation(s) 236, preprocessed results data 238, and feature sequences 240.

Storage 270 can store information or data received via the various components of feature recommendation system 202, and can provide the various components with access to that information or data, as needed. In various implementations, storage 270 comprises a data store (or computer data storage), which may be embodied as one or more persistent data repositories. Although depicted as a single component, storage 270 may be embodied as one or more data stores and may be at least partially in the cloud. Further, the information in storage 270 may be distributed in any suitable manner across one or more data stores for storage (which may be hosted externally and/or across multiple devices and/or systems).

As indicated above, system interface 214 is generally responsible for receiving transmissions to and providing transitions from feature recommendation system 202 in order to facilitate communications between feature recommendation system 202 and other systems and/or devices, such as user devices 104, 108, and 110 in FIG. 1. In some implementations, the various communications are with the user devices. For example, each user device may include one or more data acquisition agents (also referred to as "acquisition agents"), which provide the information to feature recommendation system 202.

As an example, a data acquisition agent could be integrated into each application, such as applications 106A, 106B, and 106C, and can be responsible for providing information regarding feature usage in that application. As another example, a separate data acquisition agent, such as a separate application and/or service could be employed. In some cases, a data acquisition agent on a user device collects feature usage information from multiple applications, and provides that information to feature recommendation system 202.

Information provided by a data acquisition agent to system interface 214 can include a sequence of features used by a user of an application in a user session. Examples of ways a user could invoke a particular feature is via a GUI, where each feature may have a respective option, selectable by the user, to invoke the feature. For example, an option could be a GUI element in a toolbar or other location of an application UI, a menu item in a menu of the application (e.g., a pull-down menu), and the like.

As a user invokes various features of the application, the application and/or associated acquisition agent can track, or record, their usage. For example, each feature may be assigned an identifier, or feature identifier. A feature identifier can be a unique value that represents a particular feature, such as an individual feature or workflow. A simple example of a feature identifier is F1, where F1 represents a particular feature. Other feature identifiers could be F2, F3, F4, and F5, each corresponding to a different feature of an application.

The application and/or associated acquisition agent can track, or record, feature usage as a sequence of features. A "sequence of features" refers to a group of features that captures an order in which the features of at least one application were used by a user. The order could be captured, for example, using a list of features, where the features are ordered by their time of usage. For example, a sequence of features could be {F1, F5, F4, F5, F2}, in ascending or descending order of when the features were used. In addition, or instead, the order could be captured, for example, using timestamps associated with the features. For example, the application and/or acquisition agent could associate each feature (e.g., feature identifier) with a timestamp corresponding to when that feature was used.

In some cases, user sessions are used to captures sequences of features, and semantic similarities between features may be learned based on occurrences of the features within the same user session. A "user session" refers to computer activity of a user during a defined period of time. In some cases, the period of time is defined as a predetermined amount of time (e.g., a fixed amount of time). For example, all user activity within a thirty-minute window could be defined by a data acquisition agent or other component as a user session. In some cases, a user session could be defined, at least in part, by user inactivity. For example, the system could determine a lack of user activity for a specified duration of time corresponds to an end of a user session. In addition or instead, a particular user or system action could correspond to a start of a user session. For example, the system could define the start of a user session by a launch of an application or by the system switching the application to an active mode.

In some implementations, a data acquisition agent and/or associated application(s) define one or more user sessions for the sequences of features provided to feature recommendation system 202 (e.g., using any of the various approaches described above). Transmissions to feature recommendation system 202 could be generated by the data acquisition agent and/or associated application(s) components to indicate a delineation of a user session. For example, a user session identifier could be transmitted and/or a user session could be implied by the structure and/or format of the communications.

In some implementations, feature recommendation system 202 defines user sessions from the sequences of features provided by the data acquisition agents or applications. For example, model manager 220 could define user sessions from the sequences of features, which may be stored as feature sequences 240 in storage 270. For example, model manager 220 could analyze the timestamps of the features and/or other metadata associated with feature usage that was provided to feature recommendation system 202 by the acquisition agents. As an example, model manager 220 could determine a period of inactivity to define an end of a user session based on a difference between timestamps of features (e.g., F1 was used 20 minutes after F2 and/or after the application was first closed). Model manager 220 may group these received features into user sessions, and store those groupings as feature sequences 240.

Other examples of metadata that data acquisition agents may provide with feature usage information includes user identifiers of the users who used particular features, application identifiers of the applications to which particular features correspond, and more. Any combination of this information could be used to define user sessions, or may be used by feature recommendation system 202 for other purposes in constructing feature model 234, or generating one or more feature recommendation 236.

As described above, in some implementations, a user session can include a sequence of features from more than one application. For example, a user may use one application, then launch another application and use that application. The user could alternate between applications with both being opened, or close one application and continue with the other, as examples. As will be described in further detail below, by defining user sessions to include multiple applications, feature model 234 can capture semantic relationships between features cross-application in the context in which they are used. Thus, feature recommendation system 202 can recommend a feature of one application based on a user using one or more features of one or more other applications.

As mentioned above, model manager 220 is responsible for managing feature recommendations models, such as feature model 234, which can include constructing and/or updating models. Feature model 234 can correspond to, for example, one or more neural networks, dimensionality reduction algorithms which may employ a co-occurrence matrix for each feature, probabilistic models, and the like. In various implementations, model manager 220 constructs feature model 234 by applying feature sequences 240 to feature model 234 (e.g., as training data) that learns semantic relationships between features from that data. These semantic relationships can capture similarities between features in terms of the context in which they are used in user sessions.

In various implementations, feature model 234 learns semantic relationships based on occurrences of the features in feature sequences 240. For example, model manager 220 can identify occurrences of particular features in the same user sessions, and semantically relate those features based on the occurrences using feature model 234. An occurrence of features may refer to usage of each of those features in the same user session. As a simple example, from a first user session of {F2, F5, F4, F1, F5} and a second user session of {F3, F1, F4, F1, F2}, each set of features used in the same user session could be considered an occurrence with respect to one another. For example, the first user session includes an occurrence of F2 and F4 because those features both occur in the first user session. It is noted F2 and the first instance of F5 in the first user session could be considered a different occurrence than F2 and the second instance of F5 in the first user session.

In some implementations, feature model 234 learns semantic relationships based on frequencies of the occurrences of particular features within user sessions. In the example above, feature model 234 may learn that feature F3 is more related to feature F1 then to F5, based on a frequency of occurrences in the user sessions (e.g., F3 occurs with F1 in user sessions more often than with F5). By learning which features tend to occur together within user sessions, feature model 234 can be used, for example, to recommend a feature the user would likely want to use in a user session based on having used another feature in the user session. As an example, if a user has used F3, feature model 234 could be used to recommended F1, based on learning those features frequently occur together within user sessions.

Another factor that feature model 234 can use to learn semantic relationships between features is proximity between features. For example, feature model 234 may consider a first set of features more semantically related than a second set of features based on the occurrences of the first set of features tending to be closer to each other within user sessions than the occurrences of the second set of features. In the example above, F4 and F1 may be considered more related than F4 and F2 with respect to proximity. For example, feature model 234 may determine similarity of features based on the distance between those features in a sequence a user session, such that closer occurrences are considered more similar than further occurrences.

Another factor that feature model 234 can use to learn semantic relationships between features is ordering of features in sequences of user sessions. For example, feature model 234 may consider a first set of features more semantically related than a second set of features based on the occurrences of the first set of features tending to occur in a particular order, or sequence with respect to one another within user sessions than the occurrences of the second set of features. This factor may be applied based on co-occurrence between features. "Co-occurrence" between features refers to a frequency of occurrence (e.g., an above-chance frequency of occurrence) of the features appearing within the same user session in a certain order. In the example above, F4 and F1 may be considered more related than F4 and F2 with respect to co-occurrence, as F4 appear F1 in the order of {F4, F1} twice, whereas F4 and F2 appear in the order {F4, F2} once, and {F2, F4} once.

Other factors may be accounted for by feature model 234 in learning similarity between features. Furthermore, from the forgoing it should be appreciated that the above factors can be combined in any suitable manner by feature model 234 to determine semantic relationships between features.

In some implementations, feature model 234 learns semantic relationships between features as a vector-space representation of the features. This could include feature model 234 determining semantic relationships between features that are captured as feature embeddings. For example, as indicated above, feature model 234 can comprise a feature embedding model in which individual features and/or workflows are mapped to vectors. For example, each feature may be represented by a respective vector (e.g., a feature embedding) in a vector space. The feature embeddings can be derived, for example, by mathematically embedding from a space with one dimension per feature to a vector space (e.g., a continuous vector space) with a lower dimension.

In various implementations, the feature embeddings can be learned using an NLP model that learns semantic relationships between words and/or phrases to generate word embeddings. For example, using an NLP model, words and/or phrases can be replaced with individual features and/or workflows. Furthermore, a sentence in an NLP model can be replaced with a user session. In this way, feature usage can be modeled as interactive conversations between users and systems that defines the semantic relationships between features. As such, the corpus used in the NLP models may be feature sentences 240 from many different users.

One suitable model that may be employed in feature model 234 is a Global Vectors for word representation (GloVe) model. The similarity between features can be captured by the dot product of the feature vectors captured by the model. A GloVe model may employ a local context window to learn semantic relationships between features in order to learn the context in which these items occur within user sessions. A GloVe model may also employ feature-feature co-occurrence matrices that capture items that are frequently used together.

A GloVe model may also base semantic similarity of features on the distance between those features in user sessions. For example, a representation deduction process in a GloVe model may use the distance between features to determine their relative similarity. This can capture that features used consecutively in a user session are likely to be more similar than those that are separated by a larger number of features within the session.

As an example, a GloVe model can be a global log-bilinear regression model that makes use of the feature-feature co-occurrence matrix along with local context window methods to generate feature embeddings in a low dimensional space. Advantageously, a GloVe model can efficiently leverage statistical information by training only on nonzero elements in the feature-feature co-occurrence matrix, rather than on the entire sparse matrix or on individual context windows in a large corpus.

Another suitable model that may be employed in feature model 234 is a Word2Vec model. A Word2Vec model may be implemented as a neural network (e.g., a two-layer neural network) that is trained to reconstruct usage contexts of features as feature embeddings. A Word2Vec model can comprise a Continuous Bag of Words (CBOW) model or a Skip-Gram model, as examples (e.g., with/without negative sampling), and could employ hierarchical softmax.

Using the CBOW model, for example, model manager 220 can train the neural network to predict the central feature given the features that occur in a context window around that feature. The feature embeddings, or representations, learned in this manner is sensitive to the order of the features in the context. It has been found that for learning feature usage, as opposed to word usage, improved results may be obtained by learning the feature embeddings in a more order agnostic manner. In some implementations, model manager 220 accomplishes this by including a number of random permutations of the features in one or more user sessions used to train feature model 234.

Having learned semantic relationships between features, recommendation determiner 216 can utilize feature model 234 to recommend one or more features. For example, in some implementations, recommendation determiner 216 recommends one or more features based on similarities between those features and at least one feature, as captured by feature model 234. For simplicity, a feature a recommendation is based on is referred to as an "input feature," and a feature to recommend that is determined from an input feature is referred to as a "recommended feature."

In some cases, recommendation determiner 216 determines recommended features from preprocessed results data 238, which is generated by results preprocessor 218. By generating preprocessed results data 238, the processing power used by recommendation determiner 216 to determine feature recommendations can be reduced.

Preprocessed results data 238 can allow for feature recommendation system 202 to quickly determine and provide feature recommendations with low latency. For example, this can allow for feature recommendations to be determined and provided to users of applications in real-time, during active user sessions. This can avoid situation where users continue to use the applications, and feature recommendations quickly become stale and less relevant. Preprocessed results data 238 can further be used to allow feature recommendation system 202 to handle spikes in feature recommendation requests, as significant processing involved in recommending the features can be distributed over a longer period of time and/or time shifted to low traffic times.

In various implementations, preprocessed results data 238 comprises sets of feature-feature similarity scores. For each feature (e.g., individual feature or workflow), results preprocessor 218 may utilize feature model 234 to generate a set of feature-feature similarity scores which can include a number of similarity scores, each score between the feature and another feature (e.g., each corresponding to a distance between the two feature vectors in the vector space). For example, for given a feature, results preprocessor 218 may generate N*L similarity scores, where N is a number of most similar features that will be recommended in each feature recommendation, and L is an integer (e.g., 10) to ensure a sufficient number of features to choose from for the feature recommendation. In some implementations, the set of feature-feature similarity scores for a feature and/or workflow is captured in a feature-feature matrix comprising the similarity scores.

Cache manager 222 stores and manages preprocessed results data 238 generated by results preprocessor 218, such as the sets of feature-feature similarity scores for particular features. In determining recommendations for a request, recommendation determiner 216 may query preprocessed results data 238 for particular input features via cache manager 222. Cache manager 222 retrieves the corresponding portions (e.g., sets) of preprocessed results data 238 for each input feature.

Optionally, recommendation determiner 216 may perform some processing on the received data (e.g., sets of feature-feature similarity scores) to generate final feature recommendation 236. This can include averaging similarity scores for the same features across the sets, and selecting the top features with the top resultant scores. As another example, recommendation determiner 216 could recommend the top most frequently occurring features across the sets. Many other variations of determining recommended feature from the sets are possible.

In some implantations, cache manager 222 stores preprocessed results data in a search engine. Cache manager 222 can index preprocessed results data 238 for the search engine (e.g., by input feature), and can issue queries to the search engine to receive one or more portions of preprocessed results data 238 as search results (e.g., one or more sets of feature similarity scores, such as feature-feature similarity matrices). The search engine can access preprocessed results data 238 via the index and may perform some processing on the accessed data to generate the search results. In this respect, recommendation determiner 216 may perform that processing and may be integrated, at least partially into the search engine. For example, the search results may be a set of recommended features (i.e., one or more features). As one example, a suitable search engine for various implementations is Apache Solr™. Recommendation determiner 216 may be implemented, at least partially, as a plug-in to Apache Solr.

As indicated above, in some implementations, recommendation determiner 216 determines feature recommendation 236 based on requests from user devices, such as user devices (e.g., user devices 104, 108, and 110). For example, the requests can be generated by the applications and/or acquisition agents. A request may include, for example, one or more input features, and optionally other information, such as corresponding timestamps, application identifiers, and user identifiers. For example, the user identifier can identify the user of the features of the application(s) included in the request, and an application identifier may identify the application in which the user is currently in an active user session and/or the application an input feature is from.

In some cases, the application and/or acquisition agent includes input features in requests based on those features being used in a current user session. Sending of the request could, for example, be triggered by the user launching or switching from one application to another application. For example, a user could use features of a first application, then open a second application. This could be detected by a data acquisition agent to trigger a request including at least one input feature used in the first application. The request may include an application identifier of the second application that indicates the feature recommendation is for the second application. Based on this information, recommendation determiner 216 may ensure that feature recommendation 236 provided in response to the request includes output features that are part of the second application. For example, the sets of features returned for input features could filter out features of other applications. As another example, sets of similarity scores in preprocessed results data 238 could be included for each feature for each application. In this case, the sets could be indexed by both input feature and application to retrieve predetermined similarity scores for particular applications.

As indicated above, for each input feature included in a request, recommendation determiner 216 can retrieve a corresponding set of feature-feature similarity scores and/or other preprocessed results data 238. Recommendation determiner 216 can then combine the retrieved preprocessed results data 238 to produce at least one recommended feature to include in feature recommendation 236. This may include recommendation determiner 216 weighting the set of feature-feature similarity scores for particular features to generate a set of combined feature-feature similarity scores. For example, where there is a single input feature, recommendation determiner 216 could utilize at least one feature that has a score in the set of feature-feature similarity scores as a recommended feature in feature recommendation 236, optionally after reweighting and/or filtering out any of the various scores. Where there are multiple input features, recommendation determiner 216 could merge the corresponding sets of feature-feature similarity scores (e.g., the feature-feature co-occurrence matrices). Reweighting could be applied to any of the various scores pre and/or post merging.

As an example, recommendation determiner 216, in factoring in multiple input features, may weigh scores for the features by recency (e.g., using a degrading weight function), with more recently used features having corresponding similarity scores weighted higher than older features. For example, if a user used features F1, F2, and F3 in that order in a user session, recommendation determiner 216 could weights similarity scores for F3 the highest, followed by F2, then F1. As an example, each more recently used input features could be weighted 10% higher than the preceding feature. Recommendation determiner 216 may determine this weighting using the timestamps associated with the input features.

In addition or instead, recommendation determiner 216 could factor in user preferences 232 in analyzing at least one set of feature-feature similarity scores to determine a recommended feature for feature recommendation 236. These user preferences may, for example, be captured at least partially by user profiles. User profiles may capture user preferences for particular users, which can include user preferences for particular features/workflows and/or feature/workflow types. In addition or instead, at least some user preferences could represent multiple users, such as user types, or segments (e.g., age, gender location, occupation, and the like). A user preference for a particular user or multiple users could be captured as a user vector, which can be combined with feature-feature similarity scores (e.g., the user vector could comprise a user feedback adjustment score for each feature or workflow) to reweight features. User preferences could also be used to filter out features from sets of similarity scores such that they are not recommended.

In utilizing user preferences, recommendation determiner 216 could give more weight to scores for preferred input features compared to non-preferred input features. Scores of disfavored input features could be given less weight than preferred and otherwise not disfavored input features. In addition or instead, these preferences could similarly be applied to particular features in the feature-feature similarity scores. As an example, where an input feature is F1, the set of feature-feature similarity scores may include a score capturing similarity between F1 and F2, a score capturing similarity between F1 and F3, and a score capturing similarity between F1 and F4. If F4 is preferred, the score capturing similarity between F1 and F4 could be weighted over less preferred scores.

In some implementations, user preferences 232 are generated, at least partially, based on user feedback 230. User feedback 230 comprises feedback from users provided based on one or more of feature recommendation 236 presented to those users. For example, if a feature recommendation corresponding to feature F1 is presented, the application and/or data acquisition agent can monitor user input related to that feature, and generate corresponding user feedback 230 in association with that feature. If the application and/or data acquisition agent detects a user interacts with a recommended feature presented to that user, feature recommendation system 202 may increase a user preference for that feature, and feature recommendation system 202 may reduce user preferences 232 for recommended features that are not interacted with. In addition or instead, user feedback 230 could be used as training data from feature model 234 (e.g., as negative and positive samples).

In some cases, user feedback 230 is incorporated into user preferences 232 and/or user profiles, which is then factored into one or more feature-feature similarities scores by recommendation determiner 216 in order to generate feature recommendation 236. In implementations where recommendation determiner 216 is implemented in a search engine, this could be accomplished by cache manager 222 constructing a query that instructs recommendation determiner 216 to filter out or reduce similarity scores for features with negative user feedback or enhance those with positive user feedback. For example, a query could specify to return features similar to input features F1 and F3, but not similar to feature F2 based on user feedback. For instance, recommendation determiner 216 may reduce or enhance scores associated with F2 that are returned in sets of most similar features to F1 and F3. After merging those sets, F2 will be less likely to have a top similarity score, and therefore less likely to be included as a recommended feature.

As another example, as indicated above, model manager 220 could incorporate at least some user feedback 230 into feature model 234. For example, model manager 220 could adjust the feature embeddings or other parameters of feature model 234 based on user feedback 230 (e.g., using negative or positive samples of user feedback). Subsequently, cache manager 222 could use results preprocessor 218 to generate at least some updated preprocessed results data 238 from the updated feature model 234.

In addition or instead, cache manager 222 could incorporate at least some user feedback 230 into preprocessed results data 238. For example, cache manager 222 could adjust the similarity scores as described above, based on user feedback 230.

Approaches where user feedback is used in conjunction with preprocessed results data 238 can facilitate real-time or near real-time incorporation of user feedback into feature recommendation 236, as significantly less processing may be required compared to first updating feature model 234 to determined recommendations. Feature model 234 may also be updated, for example, using batch updates that could capture updates made to preprocessed results data 238 and subsequently received sequences of features. In this way, determining recommendations can be decoupled from feature model 234 so that it can be updated as system conditions permit.

An advantage of applying user feedback 230 to feature model 234 and/or preprocessed results data 238 is that the user feedback may be applied once for many users and recommendations, rather than recommendation determiner 216 applying user feedback 230 on a recommendation-by-recommendation and user-by-user basis. For example, in an alternative approach, recommendation determiner 216 could expend processing power to reweight feature-feature similarity scores to factor in at least some user feedback 230 for each feature recommendation 236 it determines.

As indicated above, in some implementations, feature recommendation 236, determined by recommendation determiner 216, comprises multiple recommended features and corresponding scores for those features. Any combination of those recommended features may be mapped to corresponding content presented to the user in response to the request for a feature recommendation. This content may be presented to the user on a user device associated with the user, such as the user device that provided the request. For example, the content may be presented in the application during a user session in which a feature was used as an input feature for the request.

In some implementations, recommended features and/or feature scores could be mapped to one or more content items, such as a tutorial video, image, audio, content card, and/or a guided interactive tutorial in an application. In doing so, individual features could be mapped to a workflow that includes those features, which might depend on the strength of the scores of those features, and the content item(s) could correspond to that workflow. In addition or instead, recommended features and/or feature scores could be individually mapped to corresponding content items.

In some implementations, the mapping of similarity scores to a content items is performed by recommendation determiner 216. System interface 214 may then transmit at least one indicator of the content item and/or the content item itself to a user device associated with the user. As an example, the transmission could comprise a link to one or more content items. The application associated with the request could present the user with the link, and the user could access the content item(s) via the link. As another example, the application could present the content item(s) within the application (e.g., after retrieving the content items(s) via the link). As another option, the transmission could include at least one of the similarity scores or other recommended feature indicators, and the mapping to content items could occur on the user device (e.g., by the application and/or acquisition agent).

For example, upon launching the application, multiple content items could be presented related to features of that application based on features used by the user in a different application. There could be a content card presented for each recommend feature. A card could include a short description of the associated feature, as well as a photo and/or video illustrating the recommended feature. For example, if there were ten recommended features, there could be ten content cards, one for each feature. User feedback 230 may be tracked and generated through detecting interactions with these presented content items, as described above.

Figure 3:
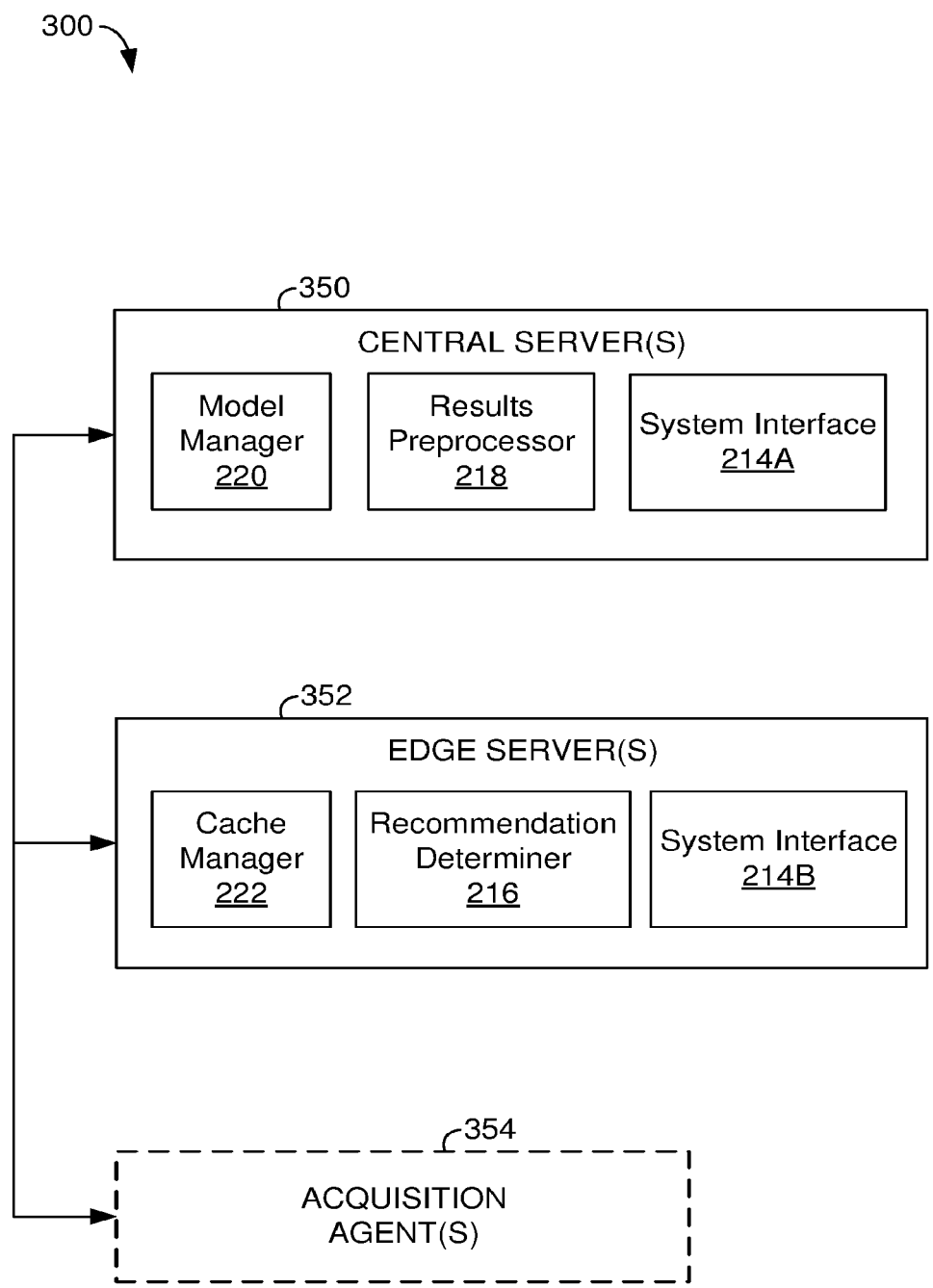
FIG. 3 is a block diagram of an exemplary architecture for a feature recommendation system in accordance with some embodiments of the invention.

With reference now to FIG. 3, a block diagram is shown of an exemplary architecture for a feature recommendation system 300 in accordance with some embodiments of the invention. In the example shown, feature recommendation system 202 is distributed across at least one central server 350 and at least one edge server 352. At least one acquisition agent 354 is also shown, which as described above, could be incorporated into at least one of user devices 104, 108, and 110.

As shown, central server 350 includes model manager 220, results preprocessor 218, and system interface 214A. Edge server 352 includes cache manager 222, recommendation determiner 216, and system interface 214B.

Model manager 220 may receive feature sequences 240 and optionally user feedback 230 and user preferences 232, and use that information to learn feature model 234. This can include computing feature embeddings (e.g., feature vectors) for all features using user session information provided by acquisition agents 354 and received by system interface 214A. Results preprocessor 218 can generate preprocessed results data 238 from feature model 234, which can include feature-feature similarity matrices. For each feature, results preprocessor 218 may determine a set of most similar features based on the dot product of feature vectors. Updates to preprocessed results data 238 can be transmitted (e.g., pushed) to each edge server 352 via system interface 214B for use by recommendation determiner 216. Cache manager 222 at each edge server 352 updates a local version of preprocessed results data 238 to reflect the updated information from central server 350.

In some implantations, central server 350 performs this process in batch mode at a pre-configured interval (e.g., daily) to reconstruct and/or update feature model 234, which may be stored at central server 350, along with preprocessed results data 238. Thus, recommendation determiner 216 may base feature recommendation 236 on a particular version of feature model 234 captured by preprocessed results data 238 at edge server 352 until central server 350 updates the model and provides a corresponding update.

Using this approach, processing power used by recommendation determiner 216 to determine feature recommendations can be reduced, and updates to feature model 234 can be made when system resources permit. Further, storing preprocessed results data 238 at edge server 352 facilitates rapid low latency responses to feature recommendation requests received by system interface 214B from acquisition agents 354. In various implementations, in order to provide feature recommendation 236 that reflects current user feedback and/or user preferences 232, edge server 352 receives that information at system interface 214B from acquisition agents 354 and uses the information to determine feature recommendations. In this way, although feature model 234 may be updated in non-real-time, feature recommendation 236 can reflect current user feedback and changes to user preferences in real-time or near real-time.

For example, as described above, cache manager 222 may update a local copy of preprocessed results data 238 used by recommendation determiner 216 to determine feature recommendation 236 and/or user preferences (e.g., user vectors) that may be combined with portions of preprocessed results data 238 to determine individual feature recommendations. Acquisition agent 354 or edge server 352 may also provide this information to system interface 214A of central server 350 for incorporation into feature model 234 (e.g., during batch mode).

Figure 4:
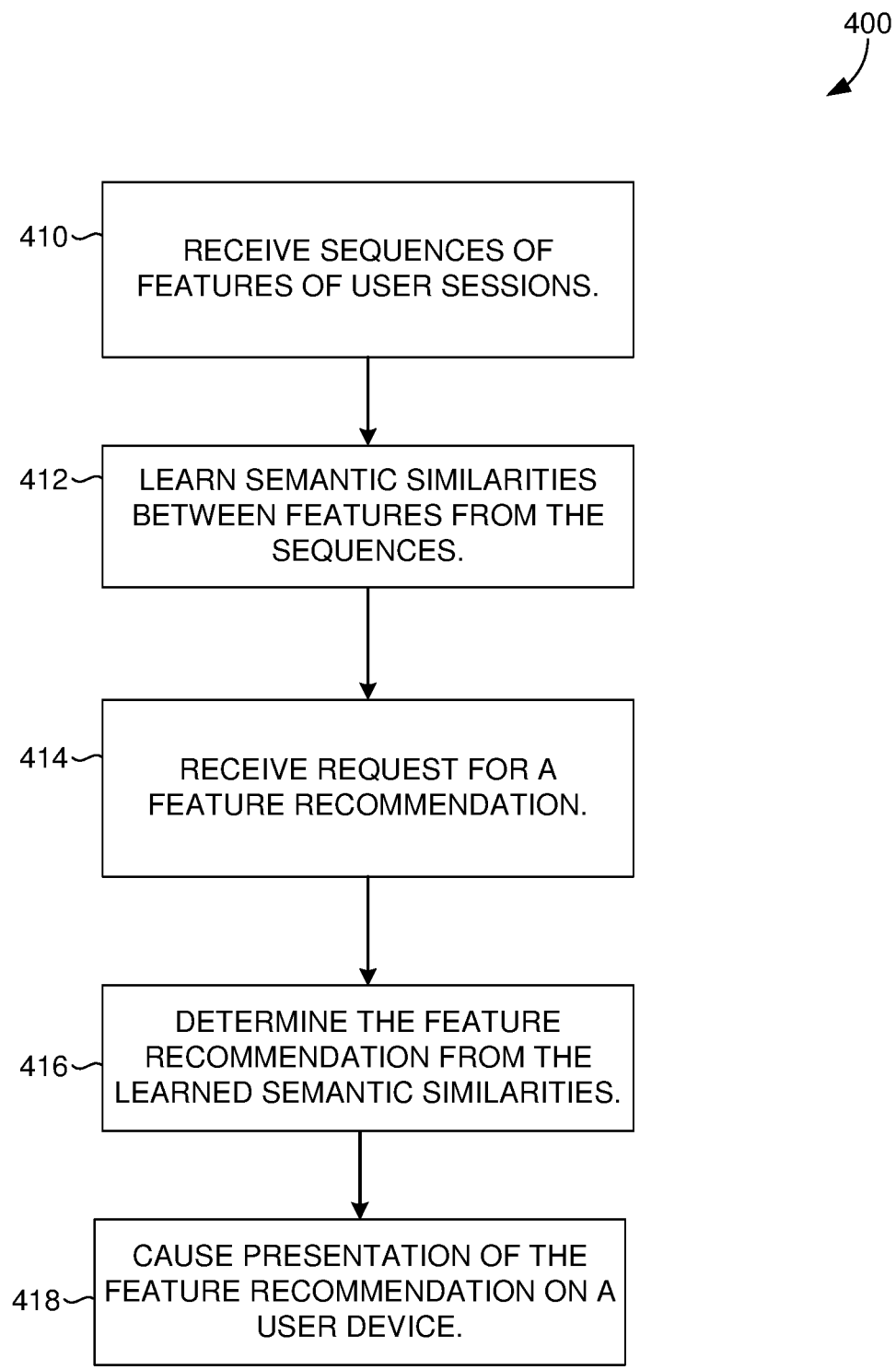
FIG. 4 is a flow diagram that illustrates a method in accordance with some embodiments of the invention.

With reference now to FIG. 4, a flow diagram is provided that illustrates a method 400 for recommending features of applications. Each block of method 400 and any other method discussed herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a server or hosted service (standalone or in combination with another hosted service), or a plug-in to another product, to name a few.

At block 410, a feature recommendation system receives sequences of features of user sessions. For example, system interface 214 can receive feature sequences 240 from a plurality of user sessions with one or more applications via user devices 104, 108, and 110. Each sequence can be of features of the one or more applications in an order the features were used by a user.

At block 412, the feature recommendation system learns semantic similarities between features from the sequences. For example, model manager 220 can apply feature sequences 240 to feature model 234 that learns semantic similarities between the features based on occurrences of the features in the sequences. Each occurrence can be of at least two of the features used in a same user session.

At block 414, the feature recommendation system receives a request from a feature recommendation. For example, system interface 214 can receive a request for a feature recommendation from one of user devices 104, 108, and 110. The request can identify at least one feature of an application used by a given user in a user session, such as application 106A, 106B, or 106C.

At block 416, the feature recommendation system determines the feature recommendation from the learned semantic similarities. For example, recommendation determiner 216 can in response to the request, determine a recommended feature from a set of the semantic similarities between the identified feature and other features. The set of semantic similarities can be provided from preprocessed results data 238.

At block 418, the feature recommendation system causes presentation of the feature recommendation on a user device. For example, system interface 214 can transmit data causing user device 104, 108, and 110 to present feature recommendation 236 to the given user.

Figure 5:
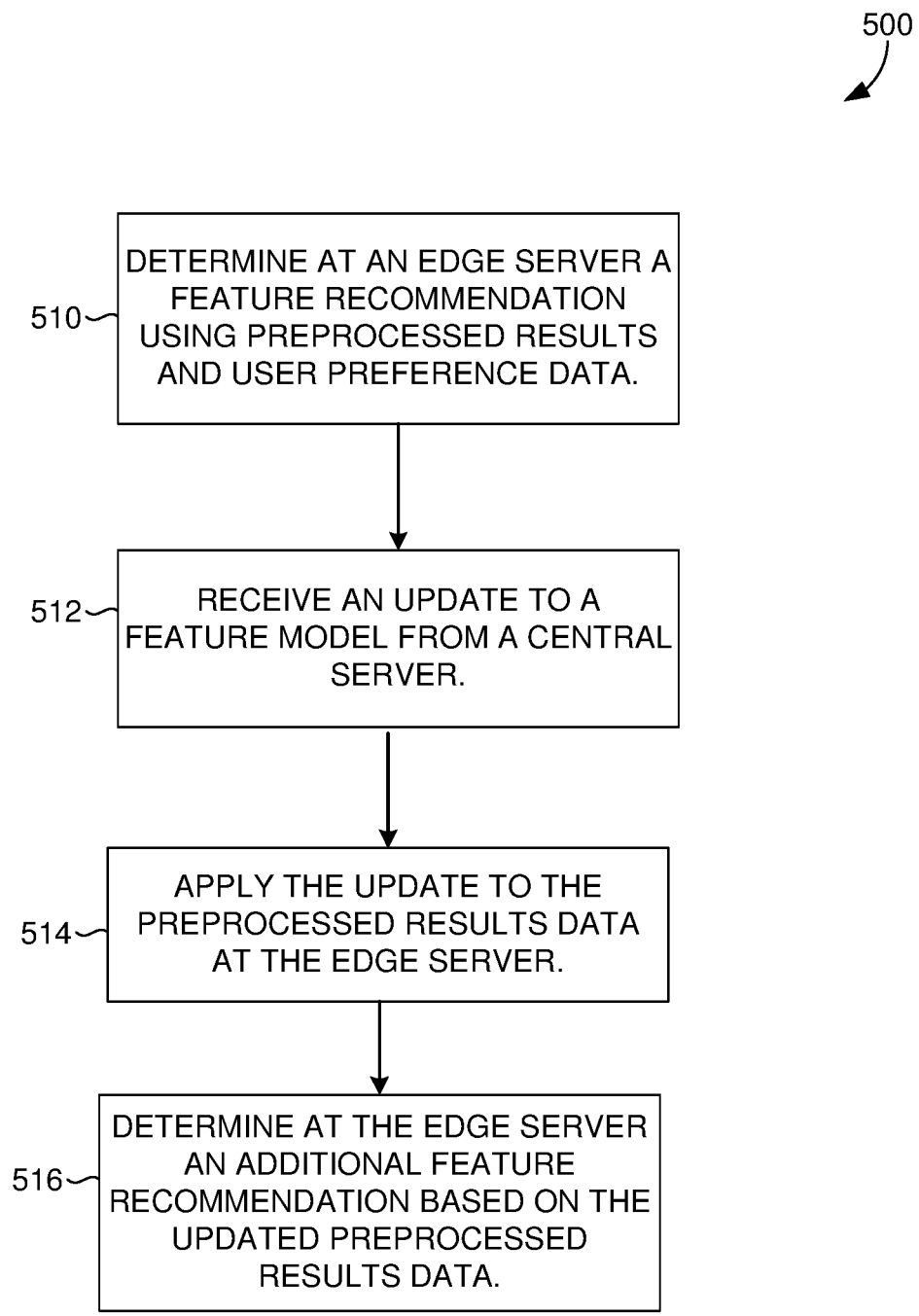
FIG. 5 is a flow diagram that illustrates a method in accordance with some embodiments of the invention.

With reference now to FIG. 5, a flow diagram is provided that illustrates a method 500 for recommending features of applications. At block 510, an edge server determines a feature recommendation using preprocessed results data and user preference data (e.g., user preferences 232 and/or user feedback 230). At block 512, the edge server receives an update to a feature model from a central server. At block 514, the feature recommendation system applies the update to the preprocessed results data at the edge server. At block 516, the edge server determines an additional feature recommendation based on the updated preprocessed results data.

Having described embodiments of the present invention, an exemplary operating environment in which embodiments of the present invention may be implemented is described below in order to provide a general context for various aspects of the present invention. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions, such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

Figure 6:
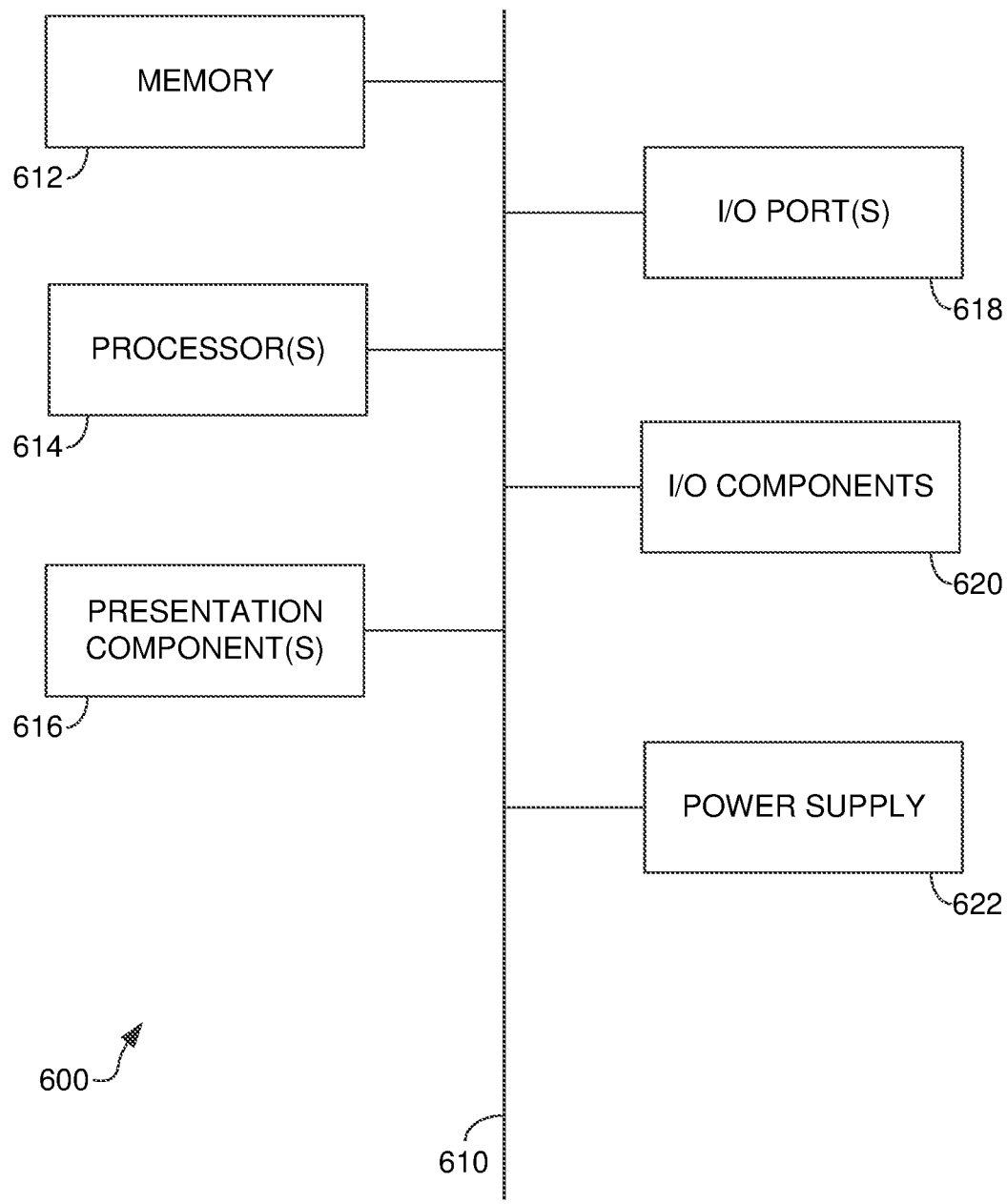
FIG. 6 is a block diagram of an exemplary computing environment suitable for use in implementing embodiments of the present invention.

With reference to FIG. 6, computing device 600 includes a bus 610 that directly or indirectly couples the following devices: memory 612, one or more processors 614, one or more presentation components 616, input/output (I/O) port(s) 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 6 is merely illustrative of an exemplary computing device that can be used in connection with one or more embodiments of the present invention. Distinction is not made between such categories as "workstation," "server," "laptop," "handheld device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O port(s) 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as, stereoscopic camera systems, infrared camera systems, RGB camera systems, and combinations of these for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

The present invention has been described in relation to particular embodiments, which are intended in all respects to be illustrative rather than restrictive. Alternative embodiments will become apparent to those of ordinary skill in the art to which the present invention pertains without departing from its scope.

The subject matter of the present invention has been described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present and future technologies.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A computer-implemented method for recommending features of applications, the method comprising:
   receiving sequences from a plurality of user sessions with one or more applications, each sequence being of features of the one or more applications in an order the features were used by a user, each feature representing one or more computing operations that are predefined as part of an application;
   analyzing the plurality of user sessions to identify, from the sequences, particular sets of the features, each set being identified based on each feature in the set having been used in a same user session;
   applying the identified sets of the features to a feature embedding model that maps the features to a vector space, the vector space capturing semantic similarities between the features based on the identified particular sets of the features and representing the features using vectors; and
   providing a feature recommendation of an application feature comprising one or more computing operations based on an identified feature of a user session using feature embeddings from the feature embedding model.

2. The method of claim 1, wherein the semantic similarities between a same set of the features is based on a frequency that the identified sets of the features include the same set of the features in the sequences.

3. The method of claim 1, wherein at least some of the features are workflows, each workflow comprising a plurality of individual features.

4. The method of claim 1, wherein the semantic similarities between a particular set of the features is based on a distance between the particular set of the features in the same user session.

5. The method of claim 1, wherein the semantic similarities between a particular set of the features is based on an ordering of the particular set of the features in the same user session.

6. The method of claim 1, wherein the semantic similarities between a particular set of the features is based on co-occurrence of the particular set of the features in the sequences.

7. The method of claim 1, further comprising generating, from the feature embeddings, a set of feature-feature similarity scores at a central server, each similarity score of the set capturing a semantic similarity between the identified feature and a respective other feature of the features, the feature recommendation being determined from the set of feature-feature similarity scores.

8. The method of claim 1, further comprising:
   generating, from the feature embeddings, preprocessed results data at a central server, the preprocessed results data corresponding to the semantic similarities between the features; and
   transmitting the generated preprocessed results data to an edge server, wherein the edge server identifies a subset of the preprocessed results data that corresponds to the identified feature and determines the feature recommendation from the identified subset.

9. The method of claim 1, further comprising:
   receiving over a network, at an edge server, preprocessed results data that corresponds to the semantic similarities between the features; and
   receiving, at the edge server, user feedback on one or more recommended features that were presented to one or more users based on the preprocessed results data, wherein the edge server determines the feature recommendation based on the preprocessed results data and the user feedback.

10. The method of claim 1, further comprising:
    receiving, by a central server, additional sequences from a plurality of user sessions with the one or more applications, each sequence being of features of the one or more applications in an order the features were used by a user;
    performing, by the central server, a batch update to the feature embedding model to update the semantic similarities between the features; and
    updating preprocessed results data at an edge server to correspond to the updated semantic similarities between the features.

11. At least one non-transitory computer-readable media having executable instructions embodied thereon, which, when executed by at least one processor, causes the at least one processor to perform a method for recommending features of applications, the method comprising:

receiving a request for a feature recommendation, the request identifying a feature of an application used by a given user in a user session;

determining, from feature embeddings of a feature embedding model, a set of semantic similarity scores between the identified feature and other features of one or more applications, the feature embedding model mapping the features to a vector space, the vector space capturing semantic similarities between the features based on particular sets of the features in sequences of the features used by users and representing the features using vectors, each feature in each set having been used in a same user session of a plurality of user sessions, wherein the semantic similarity scores correspond to distances between the vectors for the identified feature and the other features in the vector space and each feature represents one or more computing operations that are predefined as part of an application;

determining a recommended application feature for the feature recommendation from the set of semantic similarity scores; and transmitting data causing a user device to present the feature recommendation to the given user.

12. The non-transitory computer-readable media of claim 11, wherein the semantic similarities between a same set of the features is based on a frequency that the particular sets of the features include the same set of the features in the sequences.

13. The non-transitory computer-readable media of claim 11, wherein for at least some of the particular sets of the features, the features used in the same user session are of different applications.

14. The non-transitory computer-readable media of claim 11, wherein the feature recommendation is for a recommended application feature of a different application than the identified feature.

15. The non-transitory computer-readable media of claim 11, wherein each of the features operates on a digital composition being created in the one or more applications.

16. The non-transitory computer-readable media of claim 11, further comprising receiving the sequences over one or more network communications from the one or more applications.

17. The non-transitory computer-readable media of claim 11, wherein the determining the feature recommendation comprises:

identifying sets of feature-feature similarity scores, each set corresponding to the semantic similarities between a respective feature and a plurality of the features, each set being identified based on each respective feature being identified by the request;

combining the sets of feature-feature similarity scores to produce a set of recommended application features; and selecting the recommended application feature for the feature recommendation from the set of recommended features.

18. A computer-implemented system for recommending features of applications, the system comprising:

a model manager means to:

manage a feature embedding model that maps features of one or more applications to a vector space, the vector space capturing semantic similarities between the features based on particular sets of the features in sequences of the features used by users and representing the features using vectors, each feature in each set having been used in a same user session of a plurality of user sessions and representing one or more computing operations that are predefined as part of an application; and a recommendation determiner means to:

determine from feature embeddings of the feature embedding model, a set of semantic similarity scores between a feature identified by a request for a feature recommendation and others of the features; and determine a feature recommendation of an application feature from the set of semantic similarity scores.

19. The system of claim 18, wherein the semantic similarities between a same set of the features is based on a frequency that the particular sets of the features include the same set of the features in the sequences.

20. The system of claim 18, further comprising:

a system interface means to:

receive the sequences, each sequence being of the features of the one or more applications in an order the features were used by a user;

receive the request for the feature recommendation associated with a given user;

transmit data causing a user device to present the feature recommendation in response to the request.

\* \* \* \* \*